US011331843B2

(12) United States Patent
Berlin

(10) Patent No.: US 11,331,843 B2
(45) Date of Patent: May 17, 2022

(54) METHOD AND DEVICE FOR THE PRODUCTION OF PLASTIC CONTAINERS PROVIDED WITH AT LEAST ONE BUILT-IN PART BY BLOW MOLDING

(71) Applicant: VOLKSWAGEN AKTIENGESELLSCHAFT, Wolfsburg (DE)

(72) Inventor: Ralf Berlin, Gardelegen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/200,131

(22) Filed: Mar. 12, 2021

(65) Prior Publication Data
US 2021/0283820 A1 Sep. 16, 2021

(30) Foreign Application Priority Data
Mar. 12, 2020 (DE) ...................... 10 2020 203 173.8

(51) Int. Cl.
*B29C 49/20* (2006.01)
*B29L 31/00* (2006.01)

(52) U.S. Cl.
CPC ...... *B29C 49/20* (2013.01); *B29C 2049/2008* (2013.01); *B29C 2049/2052* (2013.01); *B29L 2031/7172* (2013.01)

(58) Field of Classification Search
CPC ............ B29C 49/20; B29C 2049/2008; B29C 2049/2013; B29C 49/04; B29C 2049/2052; B29L 2031/7172
See application file for complete search history.

(56) References Cited

FOREIGN PATENT DOCUMENTS

DE 102014221567 B3 2/2016
EP 2946907 A1 11/2015

*Primary Examiner* — Monica A Huson
(74) *Attorney, Agent, or Firm* — Barnes & Thornburg, LLP

(57) ABSTRACT

A method for producing a plastic container provided with at least one insert part by blow molding, which includes introducing a tubular preform, which is open at least at one end, into a blow molding tool; inserting the insert part into the open end of the preform together with a protective device, which prevents the insert part from adhering to the inner surface of the preform during the inserting operation; pulling out the protective device from the preform; closing the blow molding tool; and carrying out a blow molding operation. Also disclosed is an apparatus suitable for performing this method.

18 Claims, 7 Drawing Sheets

METHOD AND DEVICE FOR THE PRODUCTION OF PLASTIC CONTAINERS PROVIDED WITH AT LEAST ONE BUILT-IN PART BY BLOW MOLDING

PRIORITY CLAIM

This patent application claims priority to German Patent Application No. 10 2020 203 173.8, filed 12 Mar. 2020, the disclosure of which is incorporated herein by reference in its entirety.

SUMMARY

Illustrative embodiments relate to a method for producing a plastic container provided with at least one insert part by blow molding. Illustrative embodiments also relate to an apparatus for producing plastic containers provided with at least one insert part by blow molding.

BRIEF DESCRIPTION OF THE DRAWINGS

Disclosed embodiments will be explained below in a non-limiting manner with reference to the drawing. Irrespective of actual combinations of features, the features that are shown in the figures of the drawing and/or explained below may also be general features of the disclosure and correspondingly develop the disclosed embodiments. Any directional indications relate in a non-limiting manner to the exemplary embodiments shown in the figures.

DETAILED DESCRIPTION

Figure 1:
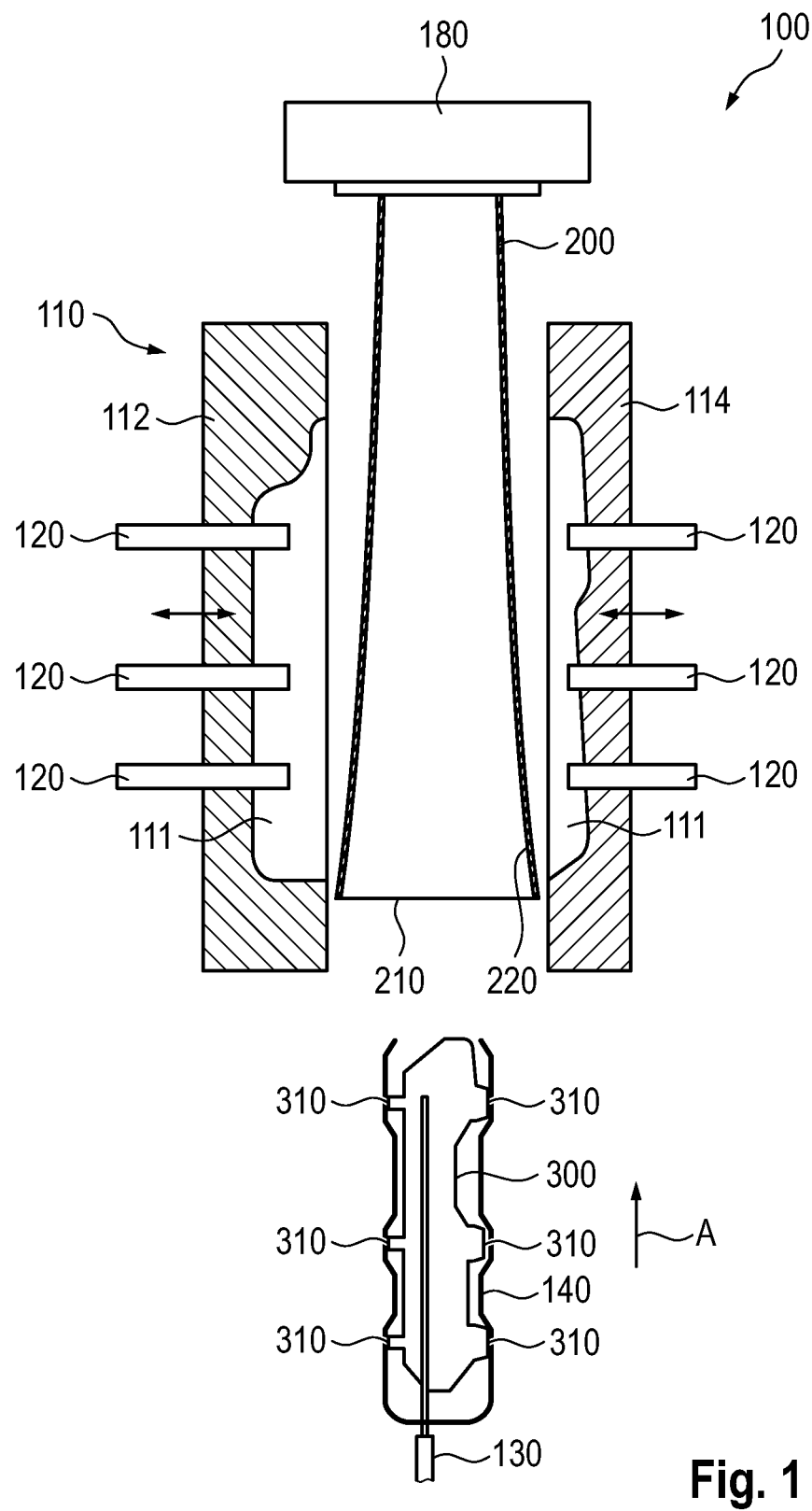
FIG. 1 depicts a schematic sectional illustration of an exemplary method sequence (in a temporal sequence) for producing a plastic container provided with at least one insert part by blow molding in an exemplary blow molding apparatus.

Plastic containers, such as, in particular, fuel tanks for transportation vehicles, can be produced by what is known as blow molding (also referred to as hollow-body blow molding). In blow molding, a hot and soft preform of thermoplastic material is inflated with blowing air (for example, compressed air or, if appropriate, also a gas) in a blow molding tool and in the process is applied to the inner surfaces of a shaping tool cavity in a matching manner. The hollow body created in this way is cooled in the blow molding tool until it has sufficient strength and/or dimensional stability and can be removed from the mold. In a conventional method operation, a tubular preform (parison) is used, which is created immediately beforehand by extrusion (what is known as extrusion blow molding).

It is known from the prior art to provide the plastic container with internal insert parts already during the production thereof by blow molding. EP 2 946 907 B1 describes such a method for producing a fuel tank equipped with an internal attachment part by blow molding. The attachment part (2) is introduced together with the preform (5) into a mold (1), with the result that the attachment part (2) is enclosed by the preform (5). The mold (1) is then closed and the blow molding of the preform (5) is carried out, wherein the preform (5) is pressed against the cavities of the mold (1) by a pressurized gas. The tank produced is then taken out of the mold (1).

The disclosed embodiments provide a method for producing a plastic container having at least one internal insert part by blow molding.

The disclosed method is defined by claim 1. The disclosure is expanded by the coordinate patent claim also to an apparatus for blow molding (blow molding apparatus).

The disclosed method for producing a plastic container provided with at least one insert part by blow molding comprises at least the following operations, which are carried out in an automated manner:

introducing a tubular (hot) preform, which is open at least at one end, into an (open) blow molding tool;

inserting or introducing the at least one insert part into the open end of the preform, wherein the insert part together with a protective device, which prevents the insert part from adhering to the inner surface of the preform during the inserting operation, is inserted or introduced into the open end of the preform;

pulling out or moving out the protective device from the preform;

closing the blow molding tool;

blow molding or carrying out a blow molding operation, wherein the plastic container is shaped, as it were, around the insert part by blowing air (as explained above);

if appropriate, opening the blow molding tool and taking out the plastic container, or removing it from the mold, after it has cooled and has sufficient strength (as explained above), wherein the insert part, in particular, at connecting points provided for this purpose, is connected in a materially bonded and, if appropriate, also form-fitting manner to the container wall, strictly speaking to the inner side of the container wall.

The operations mentioned above may be carried out in this sequence, wherein it is also possible for temporal overlaps to be provided.

The protective device (introduction protection) is a component which can be displaced relative to the blow molding tool, belongs to the blow molding apparatus and prevents undesired contact between the insert part and the inner surface of the preform when the insert part is being inserted into the preform. The protective device can be formed, for example, such that (during the inserting operation) it surrounds or encloses the insert part at least in certain regions (and thus protects it from contact with the inner surface of the preform), but itself does not adhere to the inner surface of the preform. Expressed differently: the protective device or the introduction protection is formed such that it can come into contact with the (hot) inner surface of the preform when it is being inserted or introduced into the preform, but as a result prevents contact between the insert part and the inner surface of the preform at least at certain points. Using the protective device, it is also possible for a relatively large insert part to be inserted (up to now, the maximum size of the insert part has been significantly restricted by the parison diameter of the preform). Furthermore, the protective device can also be used for the targeted widening or pressing open of the tubular preform, to be able to insert a relatively large insert part which is wider or has a larger diameter than the tubular preform.

The tubular preform can be heated before or after being introduced into the blow molding tool so that it has a temperature required for the blow molding. The tubular preform may be created by extrusion in an immediately preceding operation and, when it is being introduced into the blow molding tool, still exhibits heat of extrusion (extrusion blow molding).

The plastic container to be produced may be a fuel tank for a transportation vehicle. The at least one insert part is, for example, an anti-slosh wall, a stiffening element, a sound protection element or acoustic element, a reservoir or the like. The insert part may comprise a plurality of elements which, for example, are fastened to a carrier element or the like or which together may also be formed in one piece. The insert part may be formed from plastic, in particular, thermoplastic material.

The insert part can have a plurality of connecting points (for the connection to the container wall), wherein provision may be made for these connection points to be heated and optionally also melted or provided with an adhesive before the insert part is inserted into the preform. A materially bonded connection, in particular, a weld or an adhesive bond, can then formed with the container wall at the connecting points. The protective device may be formed such that, in this way, at least the connecting points are protected when the insert part is being inserted into the preform. For this purpose, the protective device can be formed with protective elements, which protect the connecting points (on the insert part) and, for example, are arranged next to the connecting points (with respect to the insert part) and/or at least partially cover the connecting points, to prevent an untimely or premature weld or adhesive bond to the preform.

The insert part may be inserted into the preform (during the inserting operation) using a lance or the like (which belongs to the blow molding apparatus) and then, after the insert part (inside the preform) has reached the intended end position, is fixed in the preform using tool-side pressing elements or pushing elements (which are, for example, bolts or pins), which press or push the preform (in a punctiform manner) against the insert part at the connecting points. This makes it possible already to form a weld or an adhesive bond at the connecting points. Before the pressing elements press the preform against the insert part at the connecting points, the protective device can be turned (within the preform), with the result that the connecting points (on the insert part), which are protected by the protective device during the insertion operation, are accessible. After the insert part has been fixed in the preform, the protective device can be pulled out and the lance can be withdrawn before the blow molding tool is closed. The protective device can be pulled out at the same time as the lance is withdrawn. The protective device can be fastened to the lance for this purpose. In another disclosed method embodiment, the protective device is pulled out of the preform before the pressing elements press the preform against the insert part at the connecting points, with the result that the connecting points (on the insert part), which are protected by the protective device during the inserting operation, are accessible. After the insert part has been fixed in the preform, the lance can then be withdrawn, before the blow molding tool is closed.

The open end of the tubular preform can be widened or spread open for the purpose of inserting the insert part and the protective device. This is conducive to an interference-free insertion of the insert part together with the protective device into the preform. The widening can be performed using gripping elements (for example, fingers which engage behind the opening edge), which may be arranged on the blow molding tool, in particular, on the tool halves.

The disclosed apparatus (blow molding apparatus) for producing plastic containers provided with at least one insert part by blow molding (a preform in each case) comprises at least the following components:

a blow molding tool with two tool halves (or at least two comparable tool parts), at least one of which can be displaced to open and close the blow molding tool, wherein gripping elements for widening a preform can optionally be arranged on the tool halves (as explained above);

a lance (introducing lance), which can be introduced between the tool halves when the blow molding tool is open, for introducing or inserting the insert part into an open end of the preform to be blow molded (that is likewise located between the tool halves);

a protective device, which together with the insert part can be inserted or introduced into the open end of the preform to be blow molded, to prevent the insert part from adhering to the inner surface of the preform during the inserting operation (of the insert part into the preform).

The disclosed apparatus may be a blow molding machine, in particular, an extrusion blow molding machine, in which the blow molding tool is installed. The lance and the protective device can be components of this blow molding machine.

The disclosed apparatus or blow molding machine can further comprise the following components:

a drive unit for moving the lance and a drive unit for moving the protective device, wherein provision may be made for the lance and the protective device to be movable separately using these drive units, although it is also possible for provision to be made for conjoint movability using one drive unit; and/or a control unit for the automated operation of the apparatus or blow molding machine, in particular, corresponding to the disclosed method.

The protective device can be formed with rollers, sliding points and/or the like, which can roll off or slide (without adhering) on the inner surface of the preform when the insert part together with the protective device is being inserted. The rollers or sliding points can be provided with an anti-adhesion coating. The sliding points can be formed in a punctiform, linear or areal manner. The rollers and/or sliding points can be formed and arranged such that they can widen or press open the preform in a targeted manner when the protective device is being inserted (as described above).

The protective device can be a cage-like wire frame or sheet-metal frame. Such a cage-like frame is lightweight or has a low mass and can nevertheless enclose the insert part to be inserted at least in certain regions and thus protect it effectively against contact with the inner surface of the preform, in particular, at connecting points (as explained above). The cage-like frame can be provided with an anti-adhesion coating and/or be manufactured from at least one material which does not adhere to the inner surface of the preform, wherein, on account of the cage-like configuration, the possible contact surfaces are only small in any case, thereby making adhesion more difficult.

The protective device can be formed with a folding mechanism, with the result that the protective device can be folded open before the inserting operation and/or folded together before the pulling-out operation. This is conducive to an interference-free pulling out of the protective device. The folding mechanism can be formed, for example, in a similar manner to an umbrella mechanism. The folding mechanism can be actuated, in particular, actuated automatically, using a suitable drive.

The apparatus 100 shown in FIG. 1 comprises a blow molding tool 110 with two tool halves 112, 114, which can be moved or displaced horizontally to open and close the blow molding tool 110, as illustrated by the double-headed arrows, and with a shaping tool cavity 111. The apparatus 100 also comprises a lance 130 (introducing lance), which can be moved or displaced vertically, and a protective device 140, which can be moved or displaced vertically and the functions of which will be explained in still more detail below.

FIG. 1 shows the blow molding tool 110 in an open state. Located between the tool halves 112, 114 is a tubular preform 200 of a hot and soft thermoplastic material, which was created immediately beforehand by extrusion. For this purpose, arranged above the blow molding tool 110 is an extrusion head (nozzle head) 180, which can likewise belong to the apparatus 100. A plastic container, in particular, a fuel tank, is produced from the preform 200 by blow molding, wherein, before the blow molding operation, an insert part 300 (or possibly also a plurality of insert parts), which may be likewise formed from a thermoplastic material, is inserted into the preform 200, to then be connected permanently to the inner side of the plastic container at a plurality of connecting points 310. Before the insert part 300 is inserted, the connecting points 310 can be heated up or provided with an adhesive, to achieve a materially bonded connection to the container wall of the plastic container to be produced.

The prepared insert part 300 is inserted from underneath into the open, lower end 210 of the preform 200 using the lance 130, as illustrated in FIG. 1 by the arrow A, for which purpose the open end 210 of the preform 200 is widened using gripping elements (not shown), which are arranged on the tool halves 112, 114. According to the disclosure, the insert part 300 is inserted together with the protective device 140, wherein the protective device 140 prevents the insert part 300 from adhering to the inner surface 220 of the preform 200 during the inserting operation in that, for example, the protective device 140 at least partially covers at least the connecting points 310 on the insert part 300 and thus protects against undesired contact with the inner surface 220 of the preform 200. In the exemplary embodiment shown, the protective device 140 is fastened to the lance 130.

Figure 2:
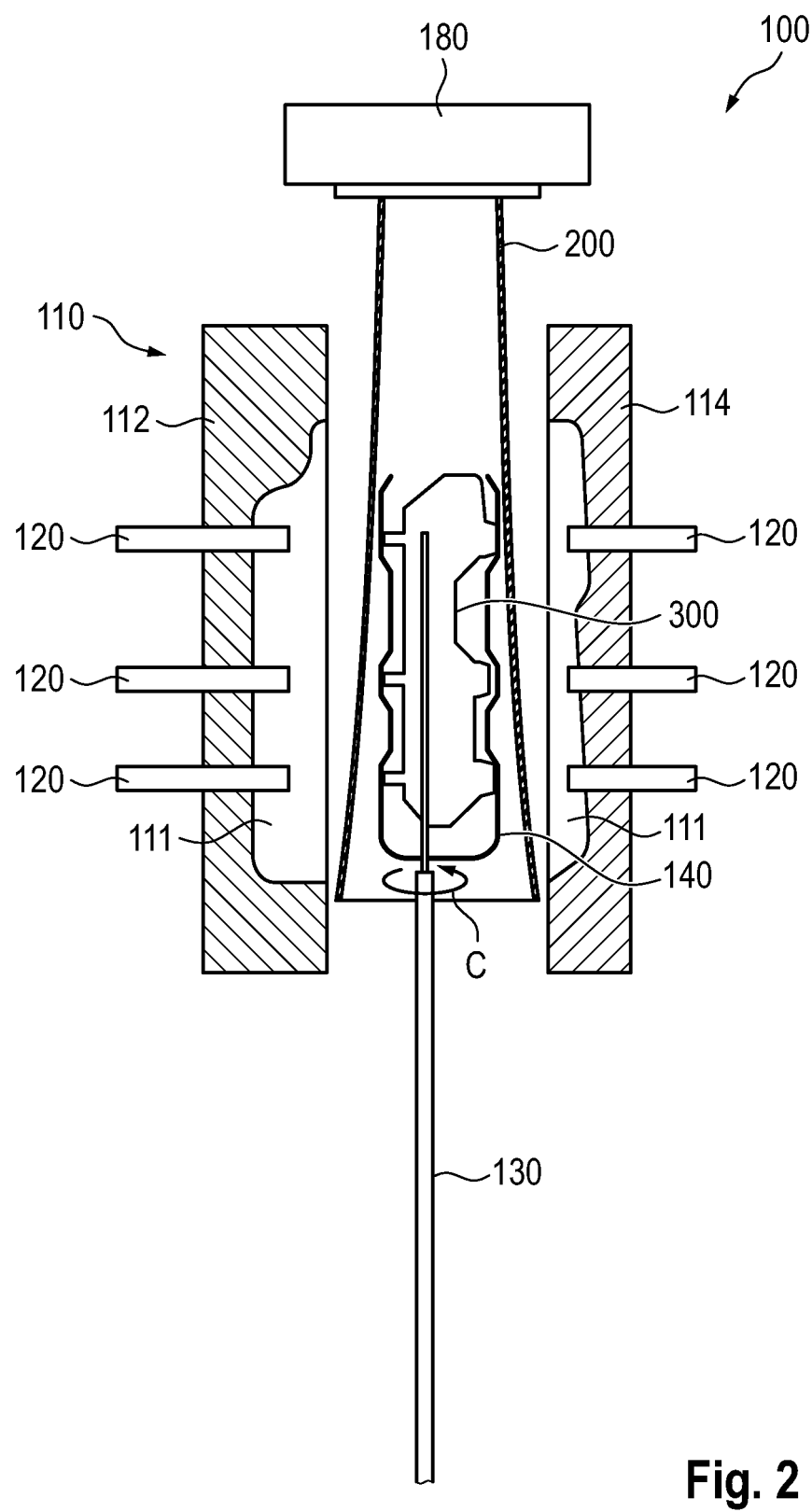
FIG. 2 depicts a schematic sectional illustration of an exemplary method sequence (in a temporal sequence) for producing a plastic container provided with at least one insert part by blow molding in an exemplary blow molding apparatus.
Figure 3:
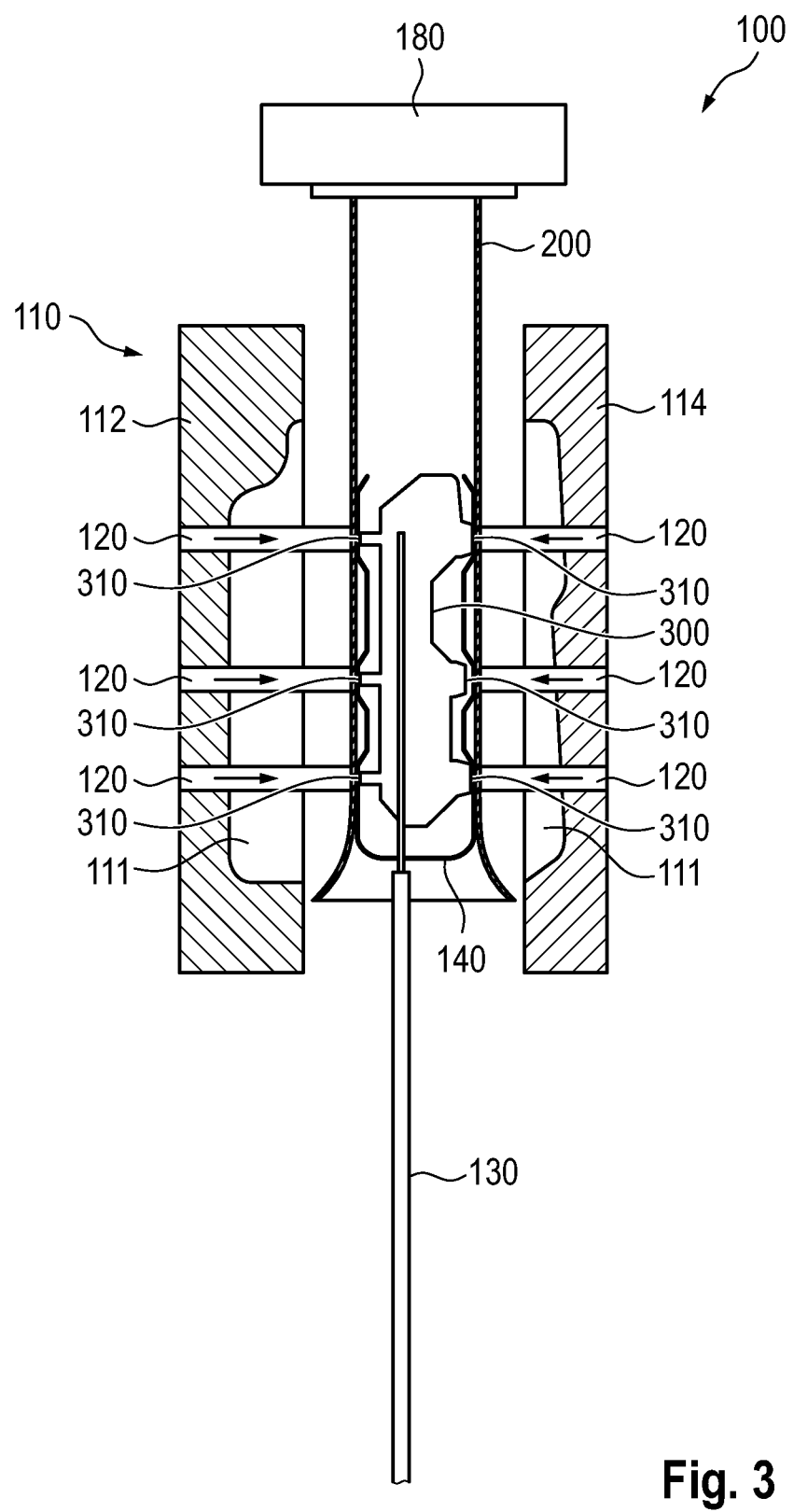
FIG. 3 depicts a schematic sectional illustration of an exemplary method sequence (in a temporal sequence) for producing a plastic container provided with at least one insert part by blow molding in an exemplary blow molding apparatus.

FIG. 2 shows the insert part 300, which is located in the intended (vertical) end position between the tool halves 112, 114 within the preform 200. Using a plurality of sleeve-like pressing elements 120, which enter the cavity 111 or precede a subsequent tool closing movement (the pressing elements 120 can be moved relative to the tool halves 112, 114), the preform 200 is then pressed at certain points or in a punctiform manner against the insert part 300 at the connecting points 310, as shown in FIG. 3. In the process, the insert part 300 is fixed to the preform 200, wherein materially bonded connections, in particular, welds or adhesive bonds, can already form between the connecting points 310 of the insert part 300 and the preform 200. Before the pressing elements 120 press the preform 200 against the insert part 300 at the connecting points 310, the protective device 140 can be turned or turned away about the axis of the lance 130, as illustrated in FIG. 2 by the arcuate arrow C, with the result that the connecting points 310 which are protected or covered by the protective device 140 are accessible, wherein a rotation C of a few degrees can be sufficient. The turning movement C of the protective device 140 and the attachment function of the lance 130 are uncoupled.

Figure 4:
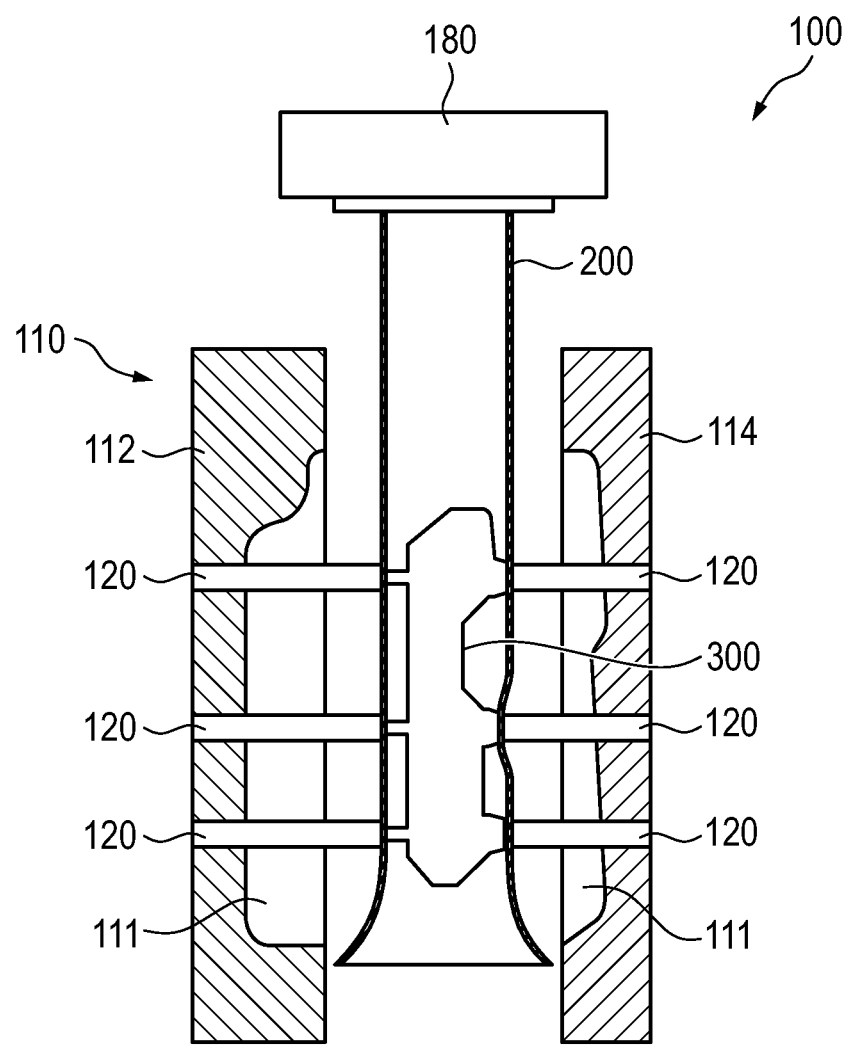
FIG. 4 depicts a schematic sectional illustration of an exemplary method sequence (in a temporal sequence) for producing a plastic container provided with at least one insert part by blow molding in an exemplary blow molding apparatus.
Figure 4:
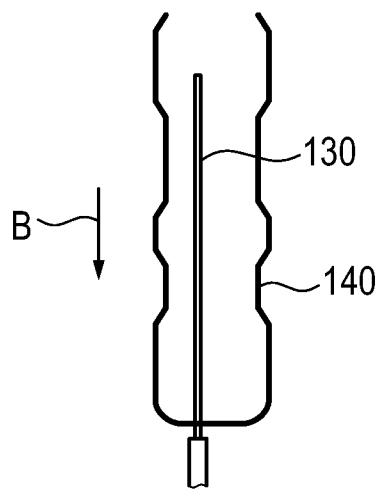
Figure 5:
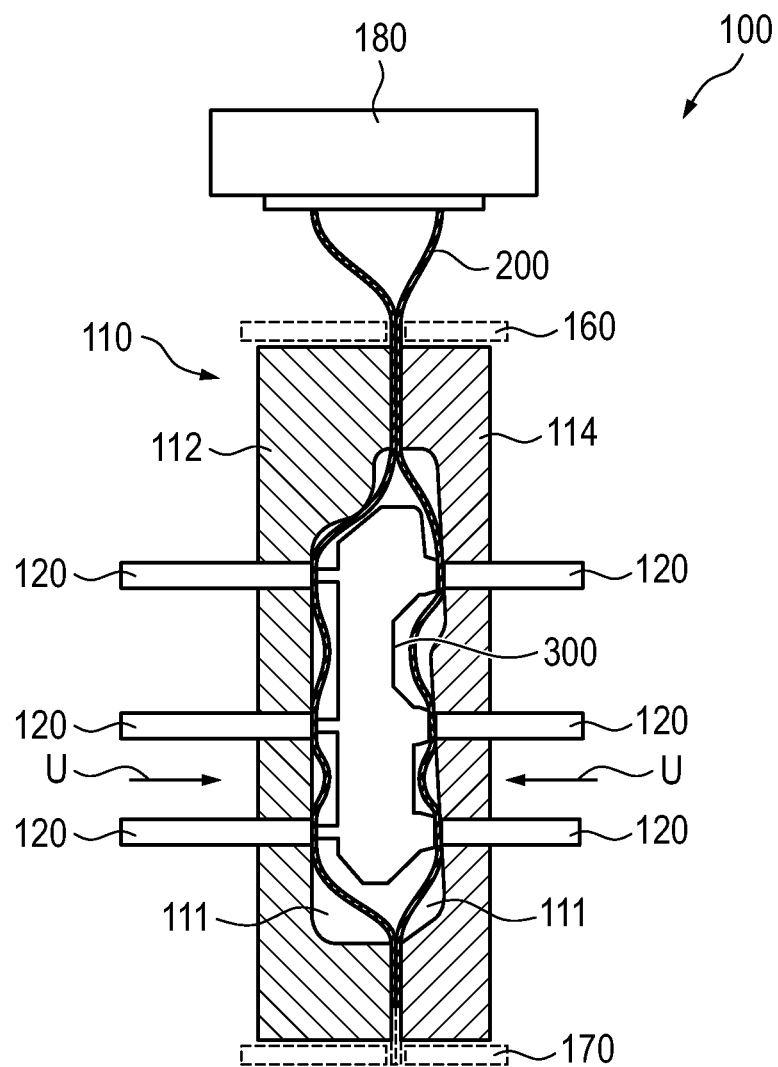
FIG. 5 depicts a schematic sectional illustration of an exemplary method sequence (in a temporal sequence) for producing a plastic container provided with at least one insert part by blow molding in an exemplary blow molding apparatus.
Figure 5:
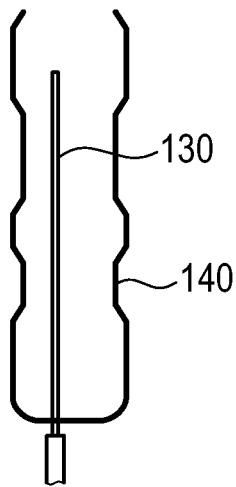

After the insert part 300 has been fixed in the preform 200 (and is held by the pressing elements 120), the lance 130 and the protective device 140 are (downwardly) withdrawn, or pulled out of the preform 200, as illustrated in FIG. 4 by the arrow B. When withdrawing the lance 130, the connection between the lance 130 and the insert part 300 is detached. This connection is, for example, of a plug-in connection. The lance 130 can, however, also be formed with a controllable gripper. The protective device 140 can be pulled out here at the same time as the lance 130 is withdrawn. The blow molding tool 110 is then closed, as illustrated in FIG. 5 by the arrow U. The preform 200 can optionally be pinched off or squeezed off above the blow molding tool 110 and at its lower end 210 using upper closing slides or upper closing plates 160 and lower closing slides or lower closing plates 170, as indicated in FIG. 5. The preform 200 closed in this way can then be preliminarily blow molded before or during the closing movement U of the blow molding tool 110.

In another disclosed method embodiment, which is not shown, the protective device 140 is pulled out of the preform 200 before the tool-side pressing elements 120 press the preform 200 against the insert part 300 at the connecting points 310, with the result that the connecting points 310 on the insert part 300 that are protected and optionally covered when being inserted are accessible. In the meantime, the insert part 300 is held by the lance 130. After the insert part 300 has been fixed in the preform 200 (and is held by the pressing elements 120), the lance 130 can then be withdrawn, before the blow molding tool 110 is closed. The lance 130 and the protective device 140 are formed for this purpose in such a way that they can be moved or displaced both together (when inserting the insert part 300) and separately (during the pulling out or withdrawing operation). To make this possible, provision can be made, for example, for the lance 130 to be formed with an internal shaft and an external hollow shaft, to which the protective device 140 is fastened. This also makes it possible to decouple, as mentioned above, the turning movement C of the protective device 140 from the attachment function of the lance 130.

Figure 6:
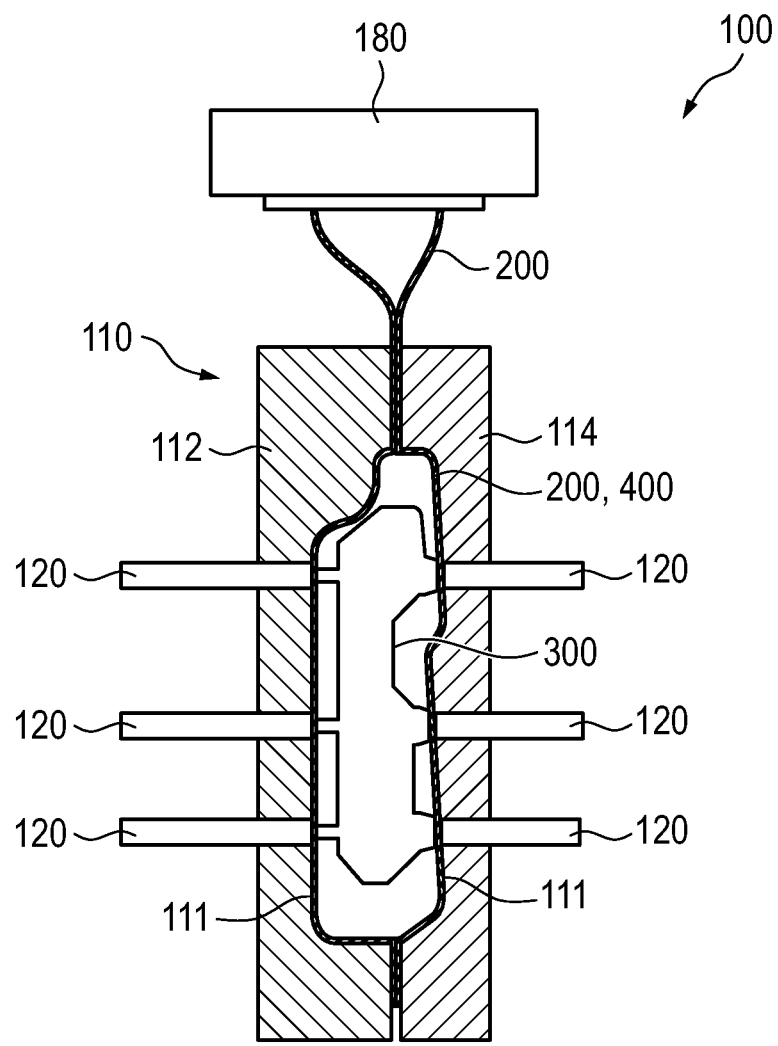
FIG. 6 depicts a schematic sectional illustration of an exemplary method sequence (in a temporal sequence) for producing a plastic container provided with at least one insert part by blow molding in an exemplary blow molding apparatus.
Figure 7:
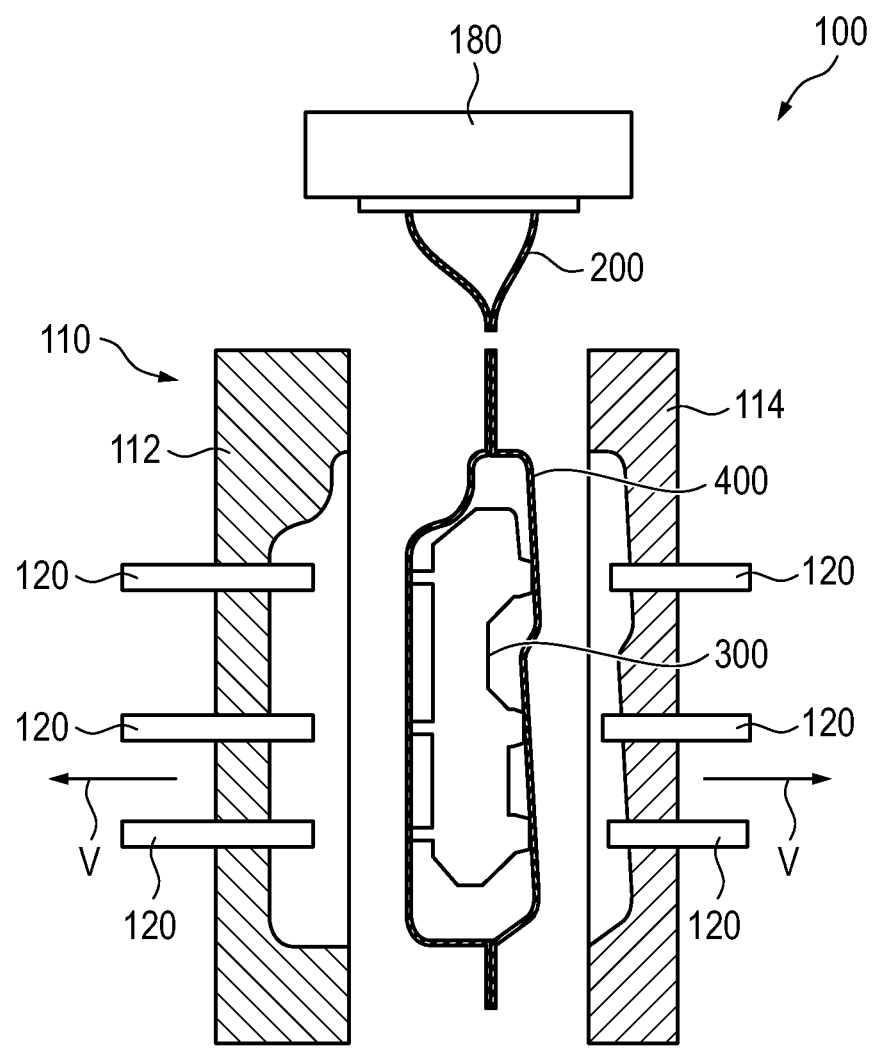
FIG. 7 depicts a schematic sectional illustration of an exemplary method sequence (in a temporal sequence) for producing a plastic container provided with at least one insert part by blow molding in an exemplary blow molding apparatus.

When the blow molding tool 110 is closed, a blow molding operation is then carried out, as shown in FIG. 6, wherein the preform 200 is punctured and inflated in a known manner by at least one blowing pin and/or at least one blowing needle. The blow molding tool 110 can then be opened, as illustrated in FIG. 7 by the arrows V, and the plastic container 400 produced, with the insert part 300 that has been blown in, can be removed from the mold and taken out, as shown in FIG. 7. The removal may be effected in an automated manner by robots. In a reworking operation, the edges can be trimmed.

LIST OF REFERENCE SIGNS

100 Apparatus
110 Blow molding tool
111 Cavity
112 Tool half
114 Tool half
120 Pressing element(s)
130 Lance
140 Protective device
160 Closing slide
170 Closing slide
180 Extrusion head
200 Preform
210 Open end
220 Inner surface
300 Insert part
310 Connecting point(s)
A Arrow (inserting movement)
B Arrow (withdrawing movement)
C Arrow (turning movement)
U Arrow (closing movement)
V Arrow (opening movement)

The invention claimed is:

1. An apparatus for producing plastic containers comprising at least one insert part by blow molding, the apparatus comprising:
   a blow molding tool with two tool halves, at least one of which is displaced to close and open the blow molding tool;
   a lance, which is introduced between the tool halves when the blow molding tool is open, for inserting the insert part into an open end of a preform;
   a protective device which, together with the insert part, is inserted into the open end of the preform to prevent the insert part from adhering to the inner surface of the preform during the inserting operation.

2. The apparatus of claim 1, wherein the protective device is formed with rollers and/or sliding points, which rolls off or slides on the inner surface of the preform during the inserting operation.

3. The apparatus of claim 1, wherein the protective device is a wire frame resembling a cage or a sheet-metal frame.

4. The apparatus of claim 1, wherein the protective device is formed with a folding mechanism.

5. The apparatus of claim 1, wherein the insert part has a plurality of connecting points, which are heated or provided with an adhesive before the insert part is inserted into the preform.

6. The apparatus of claim 5, wherein the insert part is inserted into the preform using a lance and then, after the insert part reaches the intended end position, is fixed in the preform using tool-side pressing elements which press the preform against the insert part at the connecting points.

7. The apparatus of claim 6, wherein the protective device is pulled out or turned before the pressing elements press the preform against the insert part at the connecting points, with the result that the connecting points are accessible.

8. The apparatus of claim 1, wherein the protective device is formed with a folding mechanism and is folded together before the pulling out operation.

9. The apparatus of claim 1, wherein the open end of the tubular preform is widened to insert the insert part and the protective device.

10. A method for producing a plastic container provided with at least one insert part by blow molding, the method comprising:
    introducing a tubular preform, which is open at least at one end, into a blow molding tool;
    inserting the insert part into the open end of the preform together with a protective device, which prevents the insert part from adhering to the inner surface of the preform during the inserting operation;
    pulling out the protective device from the preform;
    closing the blow molding tool; and
    carrying out a blow molding operation.

11. The method of claim 10, wherein the insert part has a plurality of connecting points, which are heated or provided with an adhesive before the insert part is inserted into the preform.

12. The method of claim 11, wherein the insert part is inserted into the preform using a lance and then, after the insert part reaches an intended end position, is fixed in the preform using tool-side pressing elements which press the preform against the insert part at the connecting points.

13. The method of claim 12, wherein the protective device is pulled out or turned before the pressing elements press the preform against the insert part at the connecting points, with the result that the connecting points are accessible.

14. The method of claim 10, wherein the protective device is formed with a folding mechanism and is folded together before the pulling out operation.

15. The method of claim 10, wherein the open end of the tubular preform is widened to insert the insert part and the protective device.

16. The method of claim 10, wherein the protective device is formed with rollers and/or sliding points, which rolls off or slides on the inner surface of the preform during the inserting operation.

17. The method of claim 10, wherein the protective device is a wire frame resembling a cage or a sheet-metal frame.

18. The method of claim 10, wherein the protective device is formed with a folding mechanism.

* * * * *